United States Patent [19]

Sharabash

[11] 3,759,089

[45] Sept. 18, 1973

[54] TEST METHOD FOR FILM-FORMING MATERIALS

[75] Inventor: Moustafa M. Sharabash, Indianapolis, Ind.

[73] Assignee: Eli Lilly and Company, Indianapolis, Ind.

[22] Filed: Oct. 26, 1971

[21] Appl. No.: 192,013

[52] U.S. Cl. .............................. 73/64.1, 73/150 R
[51] Int. Cl. ......................................... G01n 19/04
[58] Field of Search............. 73/64.1, 150 R, 150 A; 118/9

[56] References Cited
UNITED STATES PATENTS

| | | | |
|---|---|---|---|
| 2,336,238 | 12/1943 | Fordyce et al. | 73/150 X |
| 3,550,433 | 12/1970 | Warburton et al. | 118/9 X |
| 3,585,856 | 6/1971 | Schaeffer | 73/150 |

FOREIGN PATENTS OR APPLICATIONS

| | | | |
|---|---|---|---|
| 633,586 | 12/1949 | Great Britain | 73/150 |

Primary Examiner—Richard C. Queisser
Assistant Examiner—Joseph W. Roskos
Attorney—Verne A. Trask et al.

[57] ABSTRACT

A gelatin film is spread on a flat steel plate from a spreader bucket and blade moved over the plate at uniform speed. To provide controlled gelling conditions, the plate temperature is held constant by water flow across its bottom and conditioned air is circulated through a housing over the plate. A plurality of test probes mounted above the plate are depressed into contact with and withdrawn from the gelatin film, in timed sequence. The probes are wetted by un-gelled film and draw strands therefrom which remain connected to the probes, whereas the probes do not draw strands from gelled film but form dimples therein. The strands and dimples may be retained as a record, and gelation time is accurately determined by observing either or both of when the successively depressed probes cease to draw strands or start to form dimples. Strand thickness and dimple size varies at different stages to reveal gelation characteristics.

12 Claims, 7 Drawing Figures

TEST METHOD FOR FILM-FORMING MATERIALS

BACKGROUND OF THE INVENTION

This invention relates to a method for the study of the solidification of film-forming solutions, such as the gelation of aqueous solutions of gelatin.

The gelation of gellable solutions is extensively used in industry for the production of gelled films, for example in the manufacture of photographic film and in the production of medicinal capsules. The present invention is useful to determine the film-forming characteristics of other film-forming materials, but will be discussed with special reference to gelatin.

A most important characteristic of gelatin is its gelatin time, which varies from one type of gelatin to another and varies with the conditions under which gelation occurs, such as temperature, humidity, and rate and direction of air flow. The present invention provides a method and instrument capable of measuring gelation time precisely under varying conditions. The apparatus is also useful for other studies of the formation of gelatin films.

Heretofore, the best approach to determine gelatin time has been the "Drops" method first published in "Recent Advances in Gelatin and Glue Research," page 214, 1958 (Pergamon Press) by J. W. Janus of Kodak Research Laboratories, Harrow, England.

In the drops method, drops of gelatin solution are placed at measured time intervals along a level surface of a hollow metal bar held at constant temperature. After sufficient time to allow some drops to set or gell, the bar is rotated through 90° and then returned to its initial position. Gelation time is deduced from the age of drops which did and did not run. This has certain drawbacks which make it difficult to obtain an accurate gelation time. For example, drop sizes are not uniform, the surface tension of solutions of different types of gelatin will vary and affect the shape of the drop and hence its response to the gelatin conditions, and the temperature gradients in different individual drops will vary depending upon shape and size.

In accordance with the present invention, a uniform film of controlled thickness is spread on a flat surface of controlled temperature in a controlled atmosphere. Gelation time is determined by depressing into contact with, and immediately withdrawing from the film at different film-ages a series of probes. Gelled film reacts to the probes differently from un-gelled film and the different reaction permits accurate observation of the gelation time. Un-gelled film solution wets the probe tips and the probe withdrawal draws a strand or thread of gelatin from the film which is readily observed. Gelled film does not wet the probe tip so that no strand or thread is drawn, and instead, the probes rupture the gel and leave dimples in the film which are also readily observed. The transition from the strand-drawing response to the dimple-forming response is sharp and gives a precise determination of gelation time.

The film is desirably spread simultaneously along a line moving in the spreading direction. The probes are contacted with the film at different film ages. This may be done by successively contacting probes along a line at which the film was spread simultaneously, or by contacting probes spaced in the spreading direction. Conveniently, the probes are in a closely spaced array of a plurality of rows, and the film is spread under the array at a rate coordinated with the spacing.

By withdrawing the probes a limited distance to a fixed position, strands are drawn which will gel as solid filaments from the film to the probes. These and the dimples pressed in the gelled film by the probes form a permanent record of the gelation progress, which can be removed and preserved.

The strands drawn from the film at successive time periods after its formation, i.e., at different film ages, will differ from each other. For example, strands drawn at an early film age when the film stock is in liquid state will drain back to the film more than later strands. This will produce different strand shapes and sizes which will reveal and record the progress of the gelation process.

Preferred apparatus provides a flat plate on which a gelatin solution is spread from an open-bottom bucket having a trailing spreader blade, slidably driven at uniform speed across the plate. The plate temperature is controlled by water flow along a circuitous path across its bottom surface. A controlled atmosphere is provided by circulation of conditioned air through a housing enclosing the spreader and plate. The probes are mounted in a two dimensional array above the plate, preferably by means which allows them to be raised to clear the bucket spreading movement and lowered into operative position after the spreader bucket has passed.

The present method and apparatus is considered advantageous over the drops method in that a uniform thin film can be formed quickly and accurately, the thin film adopts the temperature of the supporting surface more quickly and uniformly than drops, the observable sharp change in the response of ungelled and gelled solutions when contacted by the probes provides means for accurate gelation time determination, and the strands form filaments which reveal both the gelation time and information about the progress of the gelation.

BRIEF DESCRIPTION OF THE DRAWINGS

The accompanying drawings illustrate the invention and show a preferred embodiment. In such drawings.

DESCRIPTION OF THE PREFERRED EMBODIMENT

Figure 1:
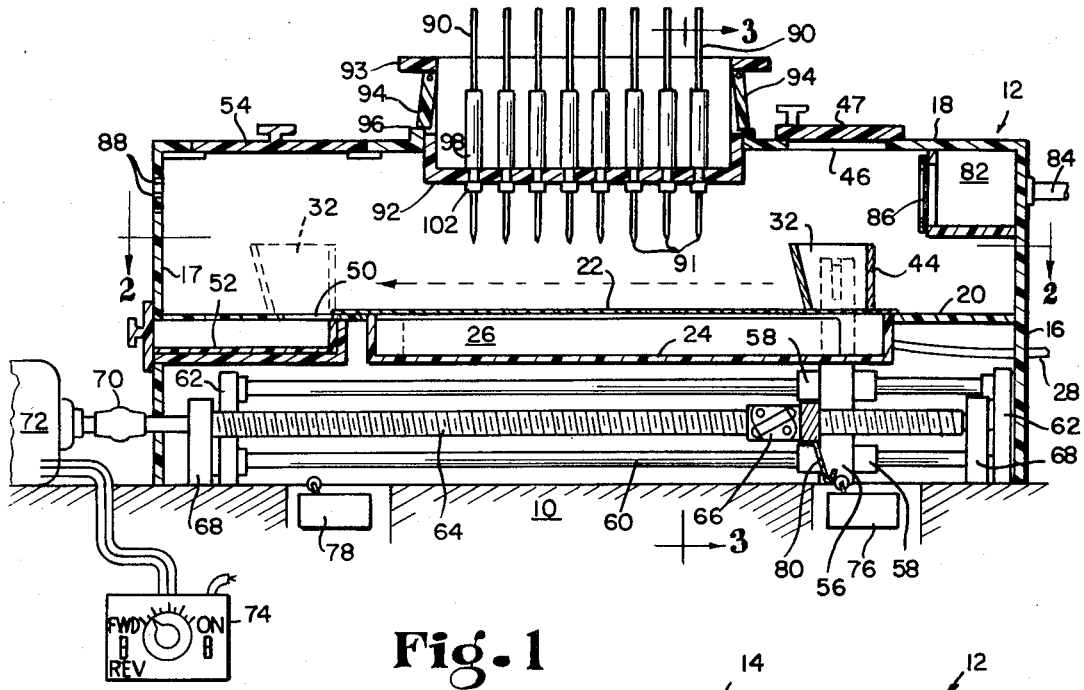
FIG. 1 is a vertical longitudinal section through a test apparatus embodying the invention.
Figure 2:
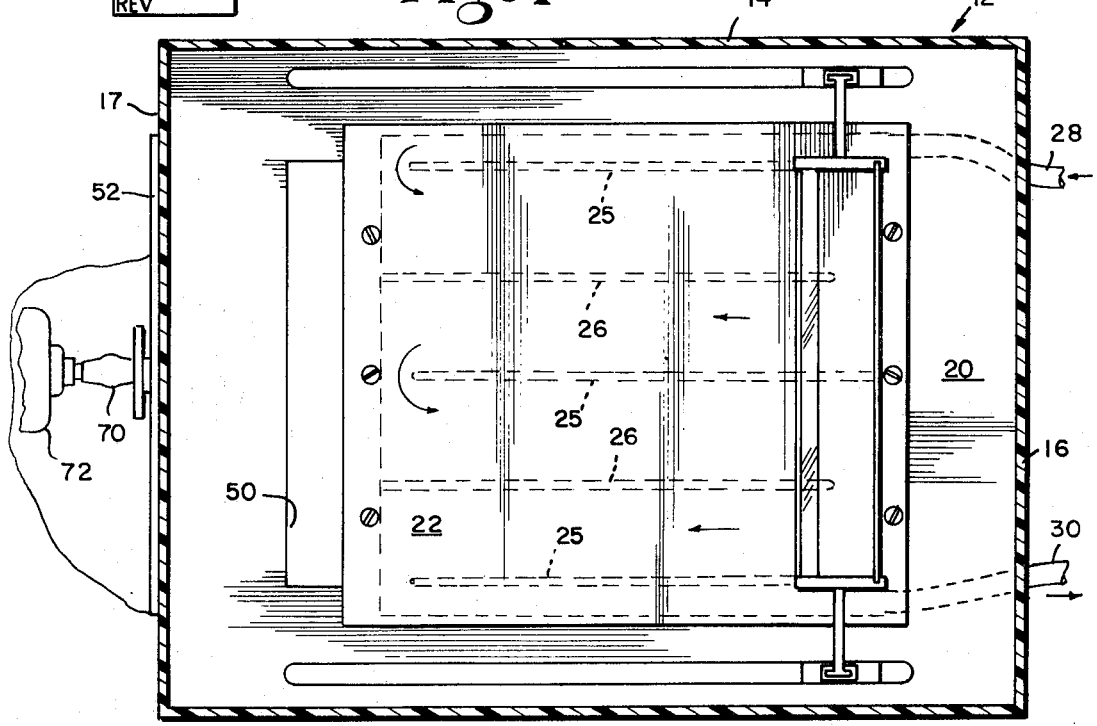
FIG. 2 is a horizontal section taken on the line 2—2 of FIG. 1.
Figure 3:
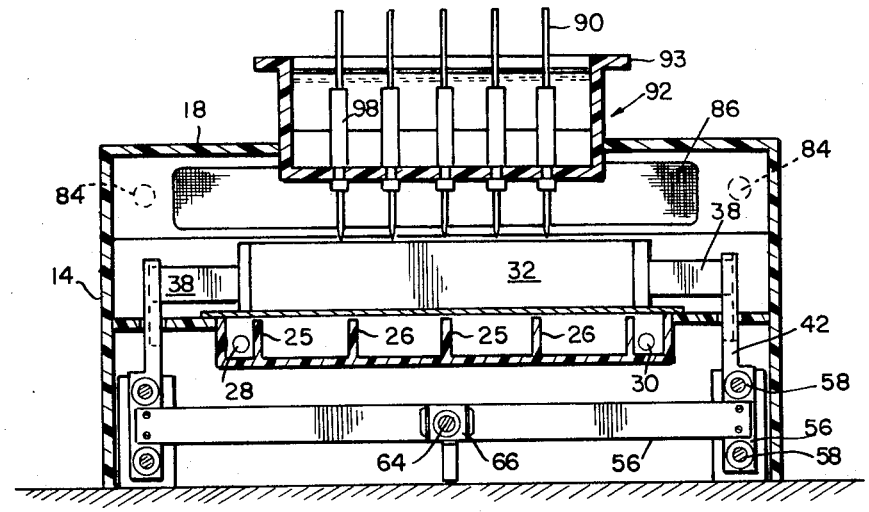
FIG. 3 is a vertical transverse section taken on the line 3—3 of FIG. 1.

The test apparatus shown in the drawings comprises a base 10 on which is mounted a housing 12 having side walls 14, end walls 16 and 17, and a top wall 18. The side and end walls support a shelf wall 20 which divides the housing and supports a flat film plate 22, desirably made of stainless steel. A water bath pan 24 is fixed against the bottom surface of the film plate 22 and contains a series of baffles 25 and 26 which define a serpentine path of water flow from an inlet 28 to an outlet 30. As shown in FIGS. 1 and 3, the top edges of the baffles 25 and 26 are slightly spaced below the bottom surface of the film plate 22 to avoid localized heat-flow differences and to allow cross flow of liquid over the entire bottom surface of that plate 22.

A spreader bucket 32 rests on the top surface of the film plate 22. It has a front wall 36, and end walls 34 which carry drive bars 38 projecting outward and having T-shaped heads 40 received in the end posts 42 of a drive carriage described below. The bottom of the bucket 32 is open to the top surface of the film plate 22 and its rear side, to the right in FIG. 1, carries a vertically adjustable spreader plate 44. This is adjusted to provide a thin slot between its lower edge and the face of the film plate, through which gelatin is spread over the plate as the bucket 32 is moved across the plate from its starting position shown in full lines at the right in FIG. 1 to its terminal position shown in dotted lines at the left.

The top wall 18 of the housing 12 contains an elongated bucket-fill opening 46 closed by a cover plate 47. The shelf wall 20 contains a dump opening 50 over which the bucket 32 stops at the end of its travel and through which it empties its remaining content of gelatin into a drawer 52 that may be withdrawn through the end wall 17 of the housing. The top wall 18 has an access opening above this terminal position, closed by a cover plate 54.

The spreader bucket 32 is driven over the plate 22 by a drive carriage 56 mounted below the shelf wall 20 within the housing 12 and having drive posts 42 at its ends extending upward through slots 21 in the shelf wall 20. The posts have vertical slots to loosely receive the T-headed arms 38 of the spreader bucket for driving the same, and to permit the bucket to be readily removed for cleaning. The carriage 56 is desirably mounted and driven in a manner which provides for accurately uniform smooth motion in order for the spreader bucket to spread a uniform film on the film plate 22. To this end, the carriage 56 is mounted at each end by a pair of ball bushings 58 of the recirculating ball type on cylindrical ways or bars 60 fixed in suitable supports 62 on the base 10. A single central threaded drive screw 64 extends lengthwise centrally between the ends of the carriage 56 and is connected to the carriage through a ball screw nut 66 having recirculating balls engaged with the screw 64. The screw 64 is journalled in posts 68 at its opposite ends, and is driven through a coupling 70 from an electric motor 72. The motor is actuated in either direction at closely-controlled variable speed by a speed control 74. The motor circuit also includes a pair of stop switches 76 and 78 mounted in the base 10 in position to be actuated by an actuating finger 80 on the carriage 56 and to stop the carriage at the initial and terminal positions of the bucket.

The atmosphere within the housing 12 is controlled by circulating suitably conditioned air through it. For this purpose, one end of the housing 12 contains a plenum chamber 82 having one or more inlet nipples 84 and having at its inner vertical wall a diffusion membrane 86 such as one or more layers of cloth through which air will diffuse at low velocity from the plenum chamber 82 into the housing 12. At the opposite end of the housing 12, the end wall 17 contains a plurality of small openings 88 distributed over the full width of an upper portion of that wall 17 to discharge air from the housing substantially uniformally over a large area. This arrangement avoids the creation of air currents within the housing 12.

At least part of the housing is transparent, e.g., of sheet plastic, to permit observation of the operation.

Figure 4:
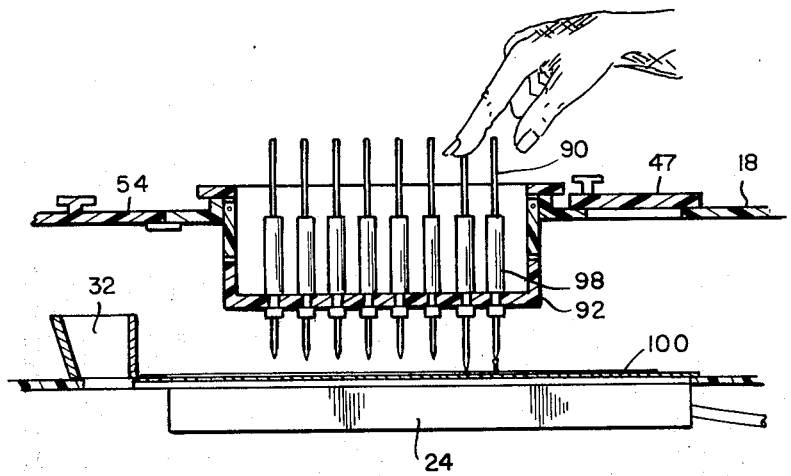
FIG. 4 is a partial longitudinal section showing the array of probes of FIG. 1 in lowered position.
Figure 5:
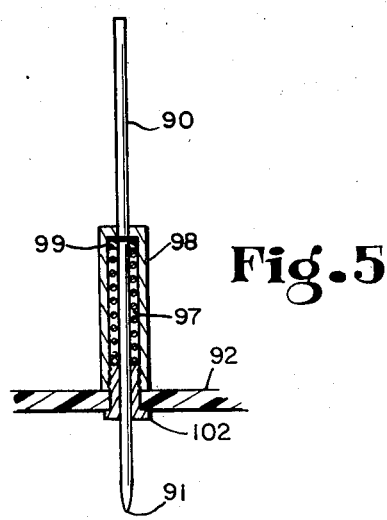
FIG. 5 is a sectional view showing the probe construction.
Figure 6:
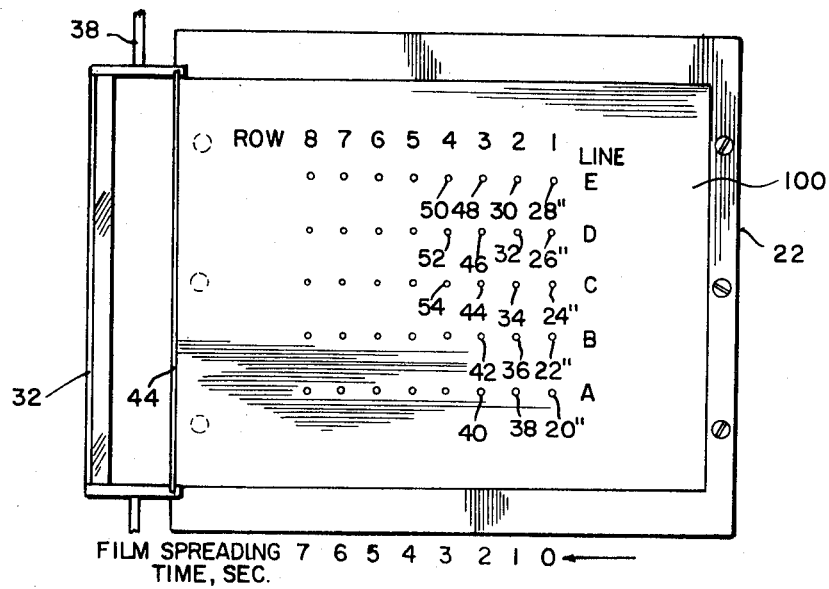
FIG. 6 is a diagrammatic plan view showing the positions of the probes over a film on the film plate.

An array of probes 90 is mounted over the film plate 22 in an arrangement of eight rows (1–8) and five lines (A–E) as shown in FIG. 6. These are carried in a tray 92 removably mounted in the top wall 18 and having two positions of vertical adjustment. When raised, as in FIG. 1, struts 94 in the end walls of the tray are swung outward to rest on the rim 96 of the surrounding opening. When lowered, the rim 93 of the tray rests on the rim 96 as shown in FIG. 4. The tray of probes is held raised during the film-spreading step so that the lower ends of the probes are out of the path of the spreader bucket 32. When it is desired to use the probes for testing the gelatin film, the tray 92 is lowered. For this purpose, the struts 94 are pressed inward to a position out of alignment with the rim 96 so that the tray can drop until its upper rim 93 rests on the rim 96 of the top wall 18. This locates the probes with their bottom ends only a short distance from the surface of the film 100 on the film plate 22, so that they can be depressed manually into contact with that film, and when retracted will be close enough to the film to retain filaments of film stock between themselves and the film.

Each probe 90 is a thin bar having a bluntly pointed or rounded lower end 91, and is mounted in vertical position in a sleeve 98 closed at its lower end by a threaded plug 102 which passes through the bottom wall of the tray 92 and holds the sleeve 98 upright. A spring 97 acts between the plug 102 and a collar 99 on the rod to spring press the probe 90 to an upward retracted position. Moderate finger pressure on the upper end of the probe 90 will depress it into contact with the gelatin film 100, and the spring will raise the probe 90 as finger pressure is removed, to withdraw the probe tip 91 from the gelatin film.

Operation is as follows: The apparatus is brought to stabilized condition by circulating temperature-controlled water through the water bath tray 24 and conditioned air through the plenum chamber 82 and the housing 12. A gelatin solution is prepared, and a charge of such solution is poured into the spreader bucket 32 through the charge opening 46. The motor 72 is then actuated to rotate the drive screw 64 and drive the carriage 56 and the spreader bucket 32 at a uniform steady rate across the film plate 22 from its full line initial position shown in FIG. 1 to its terminal dotted line position. As the bucket moves, the gelatin stock is in wetting contact with the plate through the open bottom of the bucket, and a film 100 of gelatin is spread on the film plate 22 through the narrow slot beneath the spreader blade 44 at the trailing edge of the bucket. Any gelatin solution remaining in the bucket 32 at the end of its travel is dumped into the drawer 52 through the dump opening 50, which terminates flow through the slot.

Ordinarily, a roughly approximate gelation time will be known, and the probes will be used to determine the exact time. Probe operation is begun well before gelation occurs, and the probes in the array are depressed in order and in timed sequence until after gelation has been completed. In one preferred procedure, the probes are depressed in sequence across the first row in one direction, then across the second row in the opposite direction, then across the third row in the beginning direction, and so on back and forth across the array of probes until it is observed that gelation has been well completed.

Gelation time will be readily observable from the reaction of the film 100 as the probes are contacted with and then withdrawn from the film at different stages of the gelation process. When the film is in un-gelled state, it will wet the tips of the probes, and as their springs 97 withdraw them after contact, a strand 104 or thread of gelatin solution will be drawn from the film and will remain suspended between the tip of the probe and the film. When the film has gelled, then it no longer wets the tips of the probes, and no strands or strings are drawn from the film as the probes are withdrawn. Instead, the probe contact ruptures the solidified gel, and it will be observed that a small dimple 106 is formed where the probe has contacted the film. The strands 104 and dimples 106 will remain for observation after the probing sequence has been completed, and form a record from which the gelation rate and time can be determined. Determination of gelation time from this record is made by determining the age of the film at the position of the first probe which produced a dimple and did not draw a strand from the film. That age is the elapsed time from when the film was formed at that position to when the probe was depressed into contact with the film at that position. When an array of probes is used, the time when the film was formed at each probe may be calculated from the time at which the film was formed at some predetermined position on the film plate 22, for example, when the film was formed at the first row of probes in the probe array, and from the rate of travel of the spreader bucket past each subsequent row.

Figure 7:
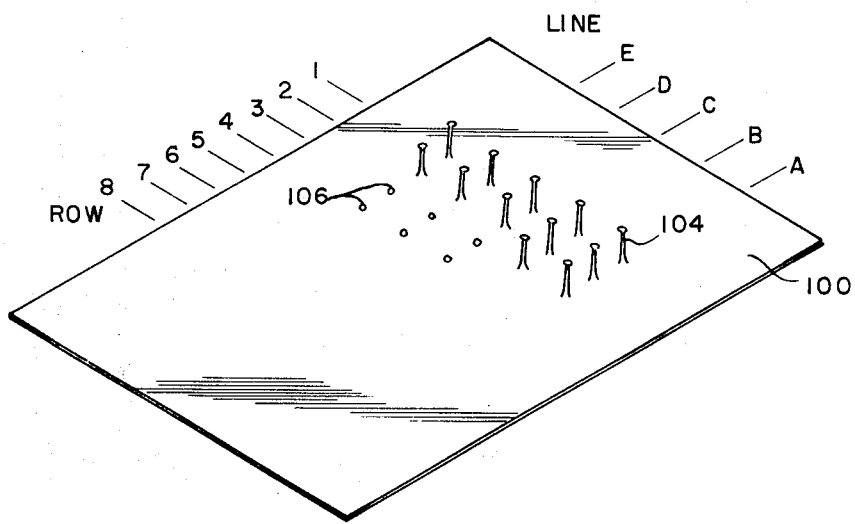
FIG. 7 is an isometric view of a gelatin film after a probing sequence has been carried out to determine gelation time.

In the array shown, there are eight rows of five probes 90 each, arranged in five lines of eight probes each. In FIGS. 6 and 7, the rows are numbered from 1 to 8 and the lines are lettered from A to E, so that the probes in row 1 may be identified as 1A, 1B, 1C, 1D and 1E, those in row 2 as 2A, 2B, etc.. In practice, it has been found convenient to drive the spreader bucket 32 at a rate of one row per second, and to take as the starting point of the time calculation the time at which the spreader blade 44 passes the first row of probes. Thus the film which will be contacted by the row 1 of the probes will be formed at time "zero," the film beneath the row 2 of the probes will be formed one second later, and the film beneath the subsequent rows 3–8 will be formed at one second intervals later, as indicated by the "film spreading times" shown on FIG. 6. In manually depressing the probes, it has been found convenient to proceed in a back and forth pattern across the array, starting say 20 seconds after time zero, and to depress the probes at 2 second intervals. Accordingly, the first probe 1A is depressed 20 seconds after time zero, and the other probes are depressed in sequence at intervals of two seconds in a back and forth pattern across the array of probes, as indicated in FIG. 6. The following table represent a specific example.

EXAMPLE I

| Row | Probe Line | Probing Time After Zero (Sec.) | Film Laying Time | Age at Probing (Sec.) | Result (FIG. 7) |
|---|---|---|---|---|---|
| 1 | A | 20 | 0 | 20 | Strand |
| 1 | B | 22 | 0 | 22 | Strand |
| 1 | C | 24 | 0 | 24 | Strand |
| 1 | D | 26 | 0 | 26 | Strand |
| 1 | E | 28 | 0 | 28 | Strand |
| 2 | E | 30 | 1 | 29 | Strand |
| 2 | D | 32 | 1 | 31 | Strand |
| 2 | C | 34 | 1 | 33 | Strand |
| 2 | B | 36 | 1 | 35 | Strand |
| 2 | A | 38 | 1 | 37 | Strand |
| 3 | A | 40 | 2 | 38 | Strand |
| 3 | B | 42 | 2 | 40 | Strand |
| 3 | C | 44 | 2 | 42 | Dimple |
| 3 | D | 46 | 2 | 44 | Dimple |
| 3 | E | 48 | 2 | 46 | Dimple |
| 4 | E | 50 | 3 | 48 | Dimple |
| 4 | D | 52 | 3 | 49 | Dimple |
| 4 | C | 54 | 3 | 51 | Dimple |

In this example, the probes were depressed at 2 second intervals beginning 20 seconds after time zero, i.e., after the film-spreading or film-laying time for the first row. The second row was laid one second later than the first row and the table shows the film laying time for the second row as one second after time zero. Similarly the third row was laid two seconds after the time zero, the fourth row three seconds after time zero, etc. This gives a film age or life time at each probe equal to the probing time after zero less the film laying time after zero.

The results are shown in FIG. 7. The probes in all of the first two rows drew strands 104 from the film 100 and the first two probes A and B of the third row drew strands, showing that gelation was not yet complete. The third probe C in row 3 and all subsequent probes did not draw strands but produced dimples 106 in the film 100, showing that gelation was complete. The first probe which drew no strand but did produce a dimple was the probe C in row 3 which was depressed at 44 seconds after time zero. The film laying time under that probe was at two seconds after time zero so that the film age or life time at that probe 3C was 42 seconds. This is taken to be the gelation time of the film in this test.

An alternative method of evaluating the gelation time with the 8-row, 5-line array of probes as shown is as follows. The film is laid in the same direction as before, proceeding from row to row at the rate of one-second per row. The film is laid simultaneously at all points along each row, and the film beneath the successive rows is laid at increasing delay intervals later. Film at row 1 is laid at time zero, at row 2 one second later, at row 3 two seconds later, etc., and at row 8 seven seconds later. After an initial waiting time of say 27 seconds, the film at all eight probe positions in line A is probed simultaneously by simultaneously depressing and then withdrawing all the probes of line A. Since the film contacted by the eight probes in the line was formed at eight different times, their simultaneous depressing will test the film at a series of eight different ages, equivalent to the initial waiting time less the delay interval for each row. Eight seconds later, all the probes of line B are depressed simultaneously, and so on with lines C-E at further eight second intervals. The result is shown in the following chart.

CHART

| Line | Probing time | Probe row No. 8 | 7 | 6 | 5 | 4 | 3 | 2 | 1 |
|---|---|---|---|---|---|---|---|---|---|
| | Film Laying Time (Sec.) | 7 | 6 | 5 | 4 | 3 | 2 | 1 | 0 |
| | | Film age at probing time | | | | | | | |
| E | 59 Sec. | 66 | 65 | 64 | 63 | 62 | 61 | 60 | 59 |
| D | 51 Sec. | 44 | 45 | 46 | 47 | 48 | 49 | 50 | 51 |
| C | 43 Sec. | 36 | 37 | 38 | 39 | 40 | 41 | 42 | 43 |
| B | 35 Sec. | 28 | 29 | 30 | 31 | 32 | 33 | 34 | 35 |
| A | 27 Sec. | 20 | 21 | 22 | 23 | 24 | 25 | 26 | 27 |

Film laid from right to left

The figures in the rectangular array represent the film ages at which the film is probed by the several probes of the array, and such ages are in a regular series in one-second steps from a 20-second film age to a 66-second film age. If the film tested has a 42 second gelation time, as before, the probing at film ages from 20 seconds to 41 seconds will draw strands from the film, and the probings at film ages from 42 seconds to 66 seconds will not draw strands but will form dimples in the test film. The gelation time will be determined by observing these results.

What is claimed is:

1. The method of determining the gelation time of a gelatin solution, comprising
    forming a film of the gelatin solution on a supporting surface and exposing the film to gelling conditions,
    probing the film at successive positions and times by contacting it with and withdrawing from it a series of probes to which gelled film reacts differently from ungelled film,
    and observing the point at which the reaction to said probing changes from that of an ungelled film to that of a gelled film.

2. The method of claim 1, wherein
    the film is probed by contacting with and withdrawing from the film a series of probes which will be wetted by and pull strands from ungelled film but will not pull strands from gelled film,
    and observation is made of the point at which successive probes cease to pull strands from the film.

3. The method of claim 1 wherein
    the film is probed by contacting it with a probe which is wetted by ungelled film and not by gelled film and observation is made of when the successive probes cease to be wetted by the film.

4. The method of claim 2 wherein
    the probes are withdrawn from the film to fixed positions spaced therefrom a limited distance such that the strands pulled from the film remain as filaments between the probes and the film.

5. The method of claim 4 wherein
    the probes are withdrawn at predetermined ages of the film at the contacting points, whereby the retained filaments form a continuing record of the condition of the film at such ages.

6. The method of claim 1 wherein
    the film is probed by contacting with and withdrawing from the film a series of probes which will form dimples in gelled film but not in ungelled film, and observation is made of when the successive probes first form dimples in the film.

7. The method of claim 1, with the addition that the film is formed by spreading the solution along the surface at a predetermined rate so that the film is formed at progressively different times along the surface, and
    the probing is done by a plurality of probes positioned to probe the film at points located at different distances along the surface corresponding to different times after the film is spread at such points.

8. The method of claim 1 with the addition that the film is formed by spreading the solution along the surface simultaneously at a plurality of points along a line transverse to the spreading direction, and the film is probed at successive times at different points along said transverse line.

9. The method of claim 2 wherein
    the film is formed by spreading the solution at a predetermined rate along the surface, and
    the film is probed by successively depressing probes in an array of probes arranged in transverse rows with respect to the film-spreading direction.

10. The method of producing a record of the gelation of a gelatin solution, which comprises
    forming a film of the gelation solution on a supporting surface and exposing the same to gelling conditions,
    contacting with and withdrawing from the film a series of probes which are wetted by the ungelled solution, at successive times after the film is formed, and thereby drawing from the film at successive times during the gelation process a series of strands,
    supporting the probes in position to retain the strands until the same have gelled,
    and thereby producing for comparison a series of strands drawn at different stages of the gelation process.

11. The method of determining the film-forming characteristics of a solution, comprising
    forming a wet film of the solution on a supporting surface and exposing the film to solidifying conditions,
    probing the film at successive positions and times by contacting it with and withdrawing from it a series of probes to which the film reacts differently at different stages of solidification,
    and observing the point at which the reaction to said probing changes.

12. The method of claim 11, wherein the film is probed by contacting with and withdrawing from the film a series of probes which will be wetted by and pull strands from the film at one stage but will not be wetted by nor pull strands from film at a later stage, and observation is made of the point at which successive probes cease to pull strands from the film.

* * * * *